(12) United States Patent
McClain et al.

(10) Patent No.: US 9,288,264 B2
(45) Date of Patent: Mar. 15, 2016

(54) SYSTEM AND METHOD FOR IMPLEMENTING A CLOUD WORKFLOW

(75) Inventors: Carolyn Bennion McClain, Springville, UT (US); Stephen R. Carter, Spanish Fork, UT (US); Lloyd Leon Burch, Payson, UT (US); Dale Robert Olds, Draper, UT (US)

(73) Assignee: NOVELL, INC., Provo, UT (US)

( * ) Notice: Subject to any disclaimer, the term of this patent is extended or adjusted under 35 U.S.C. 154(b) by 1716 days.

(21) Appl. No.: 12/612,895

(22) Filed: Nov. 5, 2009

(65) Prior Publication Data

US 2011/0106926 A1    May 5, 2011

(51) Int. Cl.
  *G06F 15/173* (2006.01)
  *H04L 29/08* (2006.01)
  *H04L 29/06* (2006.01)

(52) U.S. Cl.
  CPC ............ H04L 67/1097 (2013.01); H04L 63/00 (2013.01)

(58) Field of Classification Search
  CPC ..................... H04L 67/1097; H04L 63/00
  USPC ......................................................... 709/223
  See application file for complete search history.

(56) References Cited

U.S. PATENT DOCUMENTS

| | | | |
|---|---|---|---|
| 5,428,738 A | 6/1995 | Carter et al. | |
| 5,608,903 A | 3/1997 | Prasad et al. | |
| 5,677,851 A | 10/1997 | Kingdon et al. | |
| 5,758,344 A | 5/1998 | Prasad et al. | |
| 5,784,560 A | 7/1998 | Kingdon et al. | |
| 5,787,175 A | 7/1998 | Carter | |
| 5,832,275 A | 11/1998 | Olds | |
| 5,832,487 A | 11/1998 | Olds et al. | |
| 5,870,564 A | 2/1999 | Jensen et al. | |
| 5,878,415 A | 3/1999 | Olds | |
| 5,878,419 A | 3/1999 | Carter | |
| 5,956,718 A | 9/1999 | Prasad et al. | |
| 6,067,572 A | 5/2000 | Jensen et al. | |
| 6,108,619 A | 8/2000 | Carter et al. | |
| 6,119,230 A | 9/2000 | Carter | |
| 6,185,612 B1 | 2/2001 | Jensen et al. | |
| 6,219,652 B1 | 4/2001 | Carter et al. | |
| 6,275,819 B1 | 8/2001 | Carter | |
| 6,405,199 B1 | 6/2002 | Carter et al. | |
| 6,459,809 B1 | 10/2002 | Jensen et al. | |
| 6,519,610 B1 | 2/2003 | Ireland et al. | |
| 6,539,381 B1 | 3/2003 | Prasad et al. | |
| 6,601,171 B1 | 7/2003 | Carter et al. | |
| 6,647,408 B1 | 11/2003 | Ricart et al. | |
| 6,650,777 B1 | 11/2003 | Jensen et al. | |
| 6,697,497 B1 | 2/2004 | Jensen et al. | |
| 6,738,907 B1 | 5/2004 | Carter | |
| 6,742,035 B1 | 5/2004 | Zayas et al. | |
| 6,742,114 B1 | 5/2004 | Carter et al. | |
| 6,760,843 B1 | 7/2004 | Carter | |
| 6,772,214 B1 | 8/2004 | McClain et al. | |
| 6,826,557 B1 | 11/2004 | Carter et al. | |

(Continued)

*Primary Examiner* — Tauqir Hussain
(74) *Attorney, Agent, or Firm* — Haynes and Boone, LLP

(57) ABSTRACT

System and method for implementing a workflow of a first domain, wherein the workflow is implemented as a series of steps to accomplish a workload and wherein at least one of the steps utilizes a process, are described. In one embodiment, the method comprises establishing a mutual trust relationship between the first domain and a second domain; wherein one of the steps is authored by the second domain, the method further comprising associating with the step authored by the second domain a digital attestation for enabling the first domain to verify authorship and non-modification thereof.

20 Claims, 2 Drawing Sheets

(56) References Cited

U.S. PATENT DOCUMENTS

| | | |
|---|---|---|
| 6,862,606 B1 | 3/2005 | Major et al. |
| 6,993,508 B1 | 1/2006 | Major et al. |
| 7,043,555 B1 | 5/2006 | McClain et al. |
| 7,107,538 B1 | 9/2006 | Hinckley et al. |
| 7,152,031 B1 | 12/2006 | Jensen et al. |
| 7,177,922 B1 | 2/2007 | Carter et al. |
| 7,185,047 B1 | 2/2007 | Bate et al. |
| 7,197,451 B1 | 3/2007 | Carter et al. |
| 7,286,977 B1 | 10/2007 | Carter et al. |
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootton et al. |
| 7,506,055 B2 | 3/2009 | McClain et al. |
| 7,552,468 B2 | 6/2009 | Burch et al. |
| 7,562,011 B2 | 7/2009 | Carter et al. |
| 2008/0091613 A1* | 4/2008 | Gates et al. .................. 705/59 |
| 2011/0066847 A1* | 3/2011 | Christensen et al. ......... 713/156 |

\* cited by examiner

SYSTEM AND METHOD FOR IMPLEMENTING A CLOUD WORKFLOW

CROSS-REFERENCE TO RELATED APPLICATIONS

This application is related to the following commonly-assigned, co-pending applications, each of which is also incorporated herein by reference in its entirety:
1. U.S. patent application Ser. No. 12/612,807 filed on Nov. 5, 2009, now U.S. Pat. No. 8,065,395 issued on Nov. 22, 2011
2. U.S. patent application Ser. No. 12/612,818 filed on Nov. 5, 2009;
3. U.S. patent application Ser. No. 12/612,834 filed on Nov. 5, 2009;
4. U.S. patent application Ser. No. 12/612,841 filed on Nov. 5, 2009;
5. U.S. patent application Ser. No. 12/612,882 filed on Nov. 5, 2009;
6. U.S. patent application Ser. No. 12/612,903 filed on Nov. 5, 2009;
7. U.S. patent application Ser. No. 12/612,925 filed on Nov. 5, 2009;
8. U.S. patent application Ser. No. 12/613,077 filed on Nov. 5, 2009;
9. U.S. patent application Ser. No. 12/613,098 filed on Nov. 5, 2009;
10. U.S. patent application Ser. No. 12/613,112 filed on Nov. 5, 2009; and 11. U.S. patent application Ser. No. 12/197,833 filed on Aug. 25, 2008, now U.S. Pat. No. 8,036,396 issued on Oct. 11, 2011.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

Cloud computing and cloud storage are rapidly redefining the landscape of the enterprise data center. Rather than expanding data center capacity to meet processing and storage needs, modern enterprises are expanding into the cloud to obtain needed computing and storage resources for day to day and burst requirements. In order for cloud computing to be successful from the enterprise point of view, utilizing cloud assets must be as transparent as accessing enterprise assets in the data center. Workflow request processing and routing has become an integral part of the modern enterprise wherein rights and privileges can be maintained on an ad hoc or just in time basis. As an employee needs access to assets a workflow is started in which the appropriate permissions and attestations are obtained so that an auditable decision to allow the user access (or disallow the access) is maintained and the appropriate rights and privileges are granted.

SUMMARY

One embodiment is a method for implementing a workflow of a first domain, wherein the workflow is implemented as a series of steps to accomplish a workload and wherein at least one of the steps utilizes a process. The method comprises establishing a mutual trust relationship between the first domain and a second domain; wherein one of the steps is authored by the second domain, the method further comprising associating with the step authored by the second domain a digital attestation for enabling the first domain to verify authorship and non-modification thereof.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

The embodiments described herein provide a mechanism for allowing two or more independent trust domains to participate in a workflow to accomplish some work mechanism where part of the processing and storage may exist in the cloud. The embodiments described herein further provide a mechanism to allow the trust model to extend into the cloud such that the processing and/or storage (hereinafter collectively referred to as "process" or "processes") required by the workflow can be completely trusted by any of the participating trust environments.

Figure 1:
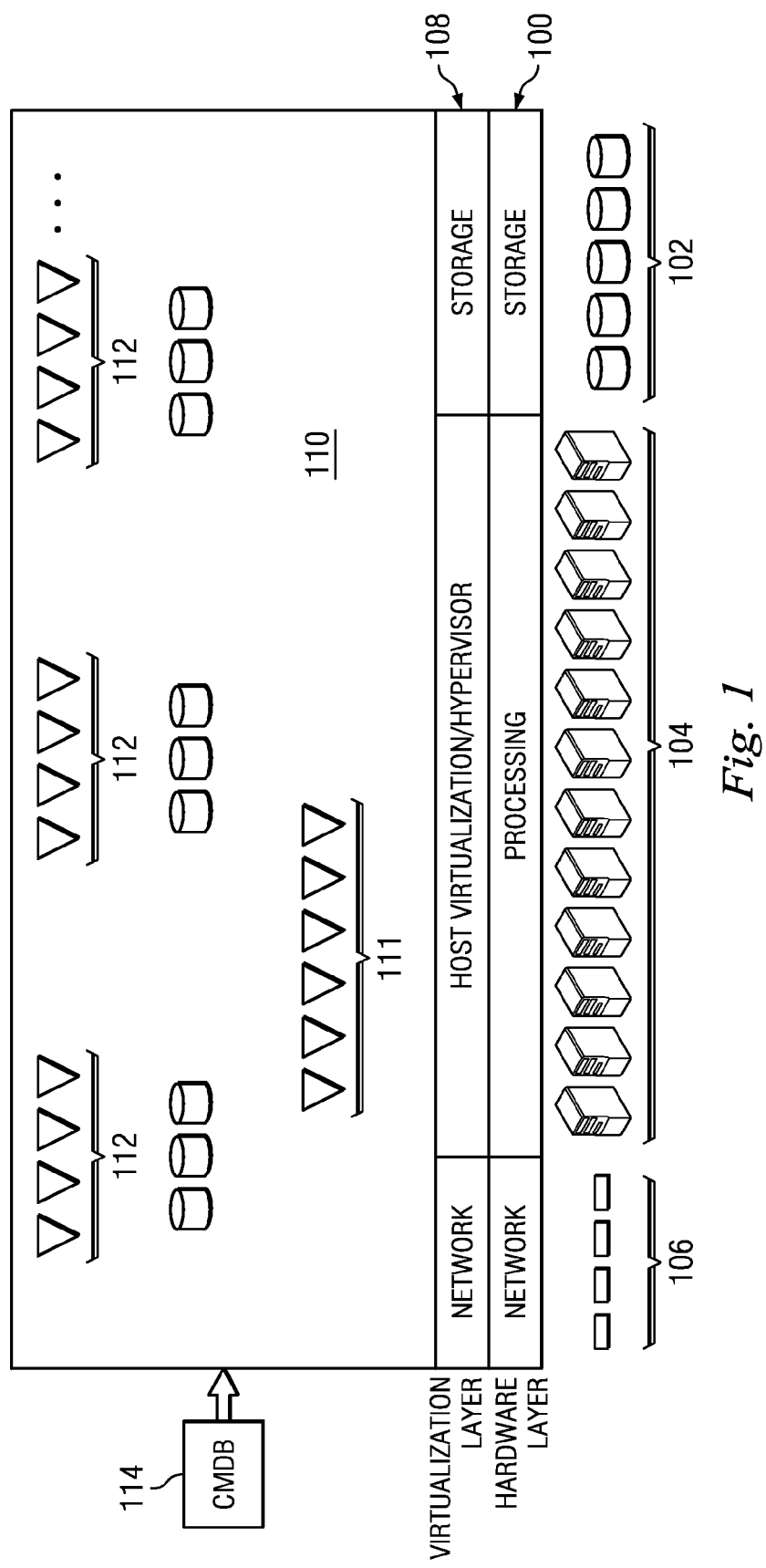
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

Figure 2:
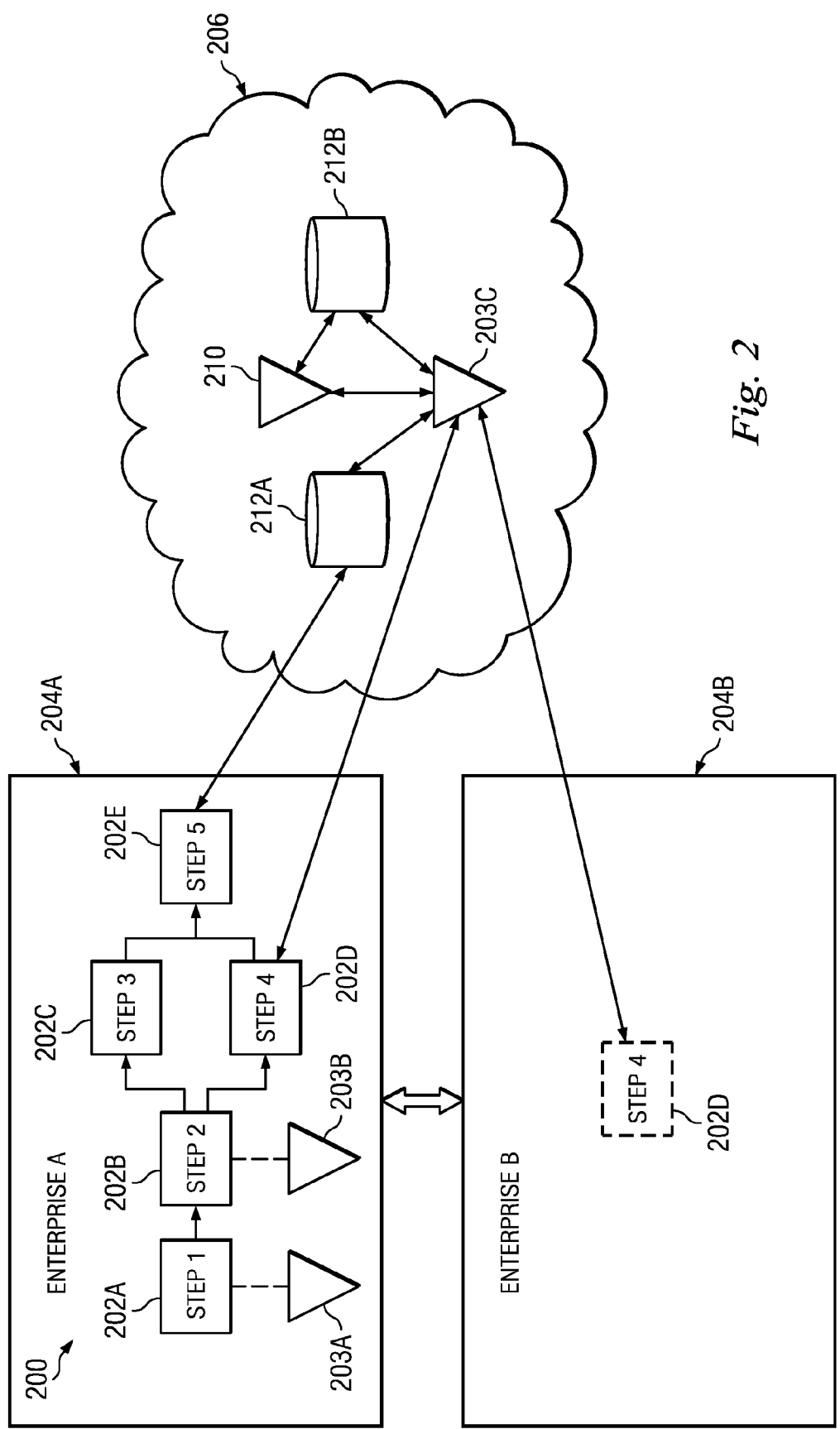
FIG. 2 is a flow diagram of one embodiment of a process for implementing a cloud workflow.

In one embodiment, a workflow is designed in a manner well-known in the art and comprises a series of steps that utilize processes to accomplish some workload. Specific types of processes, such as branching, joining, and distributing, for example, are also known in the art. As shown in FIG. 2, in an illustrative embodiment, a workflow 200 comprises multiple steps 202A-202E, each of which may utilize processes, such as processes 203A-203C, to accomplish a workload. In one embodiment, one or more of the steps 202A-202E may be authored by separate domains having a mutual trust relationship, represented in FIG. 2 by enterprises 204A and 204B, respectively comprising first and second trust domains. For example, as shown in FIG. 2, step 202D is a part of the workflow 200 accessible by the enterprise 204A, but is actually authored by a separate trust domain; specifically, the enterprise 204B, as represented by dashed lines.

In one embodiment, a step that is authored by a separate trust domain, such as the step 202D, has a digital attestation attached to or otherwise associated with it so that the enterprise 204A can verify that the step has indeed been authored by the other trust domain (in this case, the enterprise 204B) and has not been modified. In one embodiment, the steps in the workflow 200 may reference processes that reside in a cloud 206, such as the process 203C. In this case, the workflow 200 must be integrated so that such a process is accessible by all of the trust domains, or enterprises 204A, 204B, that are participating in the workflow. This can be accomplished through use of mechanisms previously disclosed one or more of the above-noted patents previously incorporated by reference; particularly U.S. patent application Ser. No. 12/612,841 filed on Nov. 5, 2009. In brief, access is granted because each process 203A-203C has associated therewith assertions that other trust domains can satisfy because of the knowledge of cryptographic keys or other attestations to which the enterprise has access.

Similarly, storage may be initiated in a portion of the workflow 200 and then moved to the cloud 206 so that other trust domains can have access to that storage to complete the workflow. In this case, the storage is tagged and associated with assertions that require attestations from the other trust domains before those trust domains are granted access. Referring again to FIG. 2, in step 202D, the process 203C is moved to the cloud 206 by the enterprise 204A in a manner that allows access by the enterprise 204B so that the step 202D can be completed.

In one embodiment, the step 202D is also moved from the enterprise 204A to either the cloud 206 or to the enterprise 204B via the cloud 206. In the first case, the enterprise 204B processes the step 202D in the cloud 206; in the second case, the step 202D is processed within the trust domain of the enterprise 204B and then the resulting information is shared back to the other trust domains (e.g., the enterprise 204A) either in the cloud 206 or through the cloud 206 or through some secure channel, implementation of which may be as described in one or more of the aforementioned patent applications.

Referring again to FIG. 2, it will be noted that steps 202A and 202B are processed in the first trust domain; i.e., the enterprise 204A. Upon completion of step 202B, the workflow 200 splits such that steps 202C and 202D are performed in parallel. Step 202C is processed by the enterprise 204A, while step 202D is processed by the enterprise 204B. Additionally, step 202D has associated therewith the process 203C, which is processed in the cloud 206. As a result, the process 203C must participate in the trust mechanism so that the enterprise 204B can utilize the process 203C without concern. Likewise, storage could be tagged by the enterprise 204A and thereafter used by the step 202D within the trust domain of the enterprise 204B.

As also illustrated in FIG. 2, another process 210, as well as storage 212A, 212B, are deployed in the cloud 206; these can comprise traditional cloud resources that must participate in the trust mechanism between the various trust domains. As further illustrated in FIG. 2, steps 202C and 202D are joined and the joint responses are processed by the step 202E, which accesses storage in the cloud 206 that was populated by the process 203C as a result of the step 202D via the enterprise 204B.

It will be recognized that, in an alternative embodiment, a persistent and organized data store, such as an Oracle database, may be deployed in the cloud for use by workflows. This alternative embodiment addresses environments in which a substantial amount of processing and storage assets are resident in the cloud and utilized by workflow processes. In such an embodiment, the step 202D may be unknown to the enterprise 204A and only a reference from the step 202B is part of the workflow 200. In this case, the enterprise 204B has complete control over the step 202D returning the result to the step 202E via some sharing mechanism (such as the storage shown in the cloud or some protocol channel). In this embodiment, the entire workflow 200 may be hosted in the cloud 206, with all trust domains 204A, 204B, having access to the workflow. Each trust domain 204A, 204B, may posses rights to all aspects of the workflow 206 or only certain ones of the steps 202A-202E may be tagged so that a given trust domain may edit only the steps tagged in such a manner as to allow access. In another embodiment, only portions of the workflow 200 are hosted in the cloud 206.

Note that all of the traditional structures of the workflow (such as step timeout and reassignment) are supported by the embodiments described herein. In fact, reassignment may occur across different trust domains because of the way that the trust mechanism is defined across the different trust domains in a manner that will be apparent to one of ordinary skill in the art.

It will be recognized that various ones of the elements and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media. It will be further recognized that domains described herein comprise appropriate hardware for implementing the functions thereof, including, but not limited to, computers and storage devices.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method comprising:
    implementing a workflow of a first domain associated with a first computing enterprise, wherein the workflow is implemented as a series of steps to accomplish a workload and wherein at least one of the steps utilizes a process, wherein implementing the workflow of the first domain includes:
        establishing a mutual trust relationship between the first domain and a second domain associated with a second computing enterprise;
        after establishing the mutual trust relationship, authoring one of the steps to accomplish the workload of the first domain by a computer of the second computing enterprise associated with the second domain; and
        associating with the step authored by the second domain a digital attestation for enabling the first domain to verify authorship and non-modification of the step authored by the second domain.

2. The method of claim 1 further comprising establishing a secure communications channel between the first domain and a cloud computing environment.

3. The method of claim 2 further comprising establishing a secure communications channel between the second domain and the cloud computing environment.

4. The method of claim 1 wherein one of the steps references a process executing in a cloud computing environment, the method further comprising implementing a mechanism whereby the referenced process is accessible by both the first and second domains.

5. The method of claim 1 further comprising:
    initiating storage in the first domain in connection with one of the steps;
    migrating the storage from the first domain to a cloud computing environment; and
    implementing a mechanism whereby the migrated storage is accessible by the first and second domains.

6. The method of claim 5 further comprising, subsequent to the migrating:
    further migrating the migrated storage from the cloud computing environment to the second domain;
    processing one of the steps requiring the further migrated storage in the second domain; and
    sharing information resulting from the processing with the first domain.

7. The method of claim 6 wherein the resulting information is shared with the first domain via one of the cloud computing environment and a secure communications channel between the first and second domains.

8. A system for implementing a workflow comprising as a series of steps to accomplish a workload, wherein at least one of the steps utilizes a process, the system comprising:
    a first domain in which the workflow is implemented;
    a second domain having a mutual trust relationship with the first domain;
    a cloud computing environment;
    wherein one of the steps of the workflow is authored by the second domain, the step authored by the second domain having associated therewith a digital attestation for enabling the first domain to verify authorship and non-modification thereof.

9. The system of claim 8 further comprising a first secure communications mechanism disposed between the first domain and the cloud computing environment.

10. The system of claim 8 further comprising a second secure communications mechanism disposed between the cloud computing environment and the second domain.

11. The system of claim 8 wherein one of the steps references a process executing in the cloud computing environment, the system further comprising a mechanism whereby the referenced process is accessible by both the first and second domains.

12. The system of claim 8 further comprising storage initiated in the first domain in connection with one of the steps and migrated to the cloud computing environment, wherein the migrated storage is accessible by the first and second domains.

13. The system of claim 12 wherein the storage is further migrated from the cloud computing environment to the second domain and one of the steps requiring the further migrated storage is processed in the second domain, the system further comprising a mechanism for sharing information resulting from the processing with the first domain.

14. The system of claim 13 wherein the mechanism for sharing the resulting information comprises one of the cloud computing environment and a secure communications channel between the first and second domains.

15. A system for implementing a workflow comprising a series of steps for accomplishing a workload, wherein at least one of the steps utilizes a process, the system comprising:
    a first computing enterprise associated with a first domain in which the workflow is implemented;
    a second computing enterprise associated with a second domain having a mutual trust relationship with the first domain, wherein one of the steps to accomplish the workload of the first domain is authored by a computer of the second computing enterprise associated with the second domain; and
    a digital attestation associated with the step authored by the second domain for enabling the first domain to verify authorship and non-modification of the step authored by the second domain.

16. The system of claim 15 further comprising:
    a secure communications channel established between the first domain and a cloud computing environment; and
    a secure communications channel established between the second domain and the cloud computing environment.

17. The system of claim 15 wherein one of the steps references a process executing in the cloud computing environment, the system further comprising a communications channel for rendering the referenced process accessible by both the first and second domains.

18. The system of claim 15 further comprising:
- storage in the first domain connected with one of the steps;
- storage in the cloud computing environment including data migrated from the storage of the first domain; and
- a secure communications channel for rendering the storage in the cloud computing environment accessible by the first and second domains.

19. The system of claim 18 wherein the data migrated to the storage in the cloud computing environment is further migrated to the second domain;
- wherein a computer of the second computing enterprise associated with the second domain processes one of the steps requiring the further migrated data in the second domain; and
- wherein the second domain shares information resulting from the processing of the further migrated data with the first domain over the secure communications channel.

20. The system of claim 19 wherein the secure communications channel comprises a first portion between the first domain and the cloud computing environment and a second portion between the second domain and the cloud computing environment.

* * * * *